United States Patent [19]

Prinz

[11] Patent Number: 5,000,588
[45] Date of Patent: Mar. 19, 1991

[54] CYLINDRICAL-ROLLER BEARING

[75] Inventor: Werner Prinz, Steyr, Austria

[73] Assignee: SKF Steyr GmbH, Steyr, Austria

[21] Appl. No.: 629,671

[22] Filed: Jul. 11, 1984

[30] Foreign Application Priority Data

Jul. 19, 1983 [AT] Austria ............................ 2637/83

[51] Int. Cl.$^5$ .............................................. F16C 19/26
[52] U.S. Cl. ..................................... 384/561; 384/477
[58] Field of Search ............... 384/96, 499, 511, 569, 384/488, 576, 448, 505, 506, 564, 487, 527; 368/DIG. 11; 29/123, 119, 126; 24/622, 297

[56] References Cited

U.S. PATENT DOCUMENTS

| | | | |
|---|---|---|---|
| 2,259,325 | 10/1941 | Robinson | 384/569 |
| 2,757,054 | 7/1956 | Van De Warker | 384/569 |
| 2,965,923 | 12/1960 | Smith et al. | 29/123 |
| 3,084,004 | 4/1963 | Henley | 384/448 |
| 3,089,221 | 5/1963 | Barr | 384/511 X |
| 3,975,066 | 8/1976 | Hofmann et al. | 384/527 X |
| 4,363,160 | 12/1982 | Wilbrow | 24/297 |
| 4,395,078 | 7/1983 | Smith, Sr. et al. | 384/506 |

Primary Examiner—Daniel P. Stodola
Attorney, Agent, or Firm—Marmorek, Guttman & Rubenstein

[57] ABSTRACT

A cylindrical-roller bearing comprises, associated with at least one of its external and internal races, a retaining member for the rollers of the bearing. In order to lower the friction component and provide better conditions for assembly of the bearing, and to simplify manufacture, at least one of the retaining members is constituted by a retaining ring of synthetic plastics resin material being in snap connection with the respective bearing race with which it is associated.

3 Claims, 1 Drawing Sheet

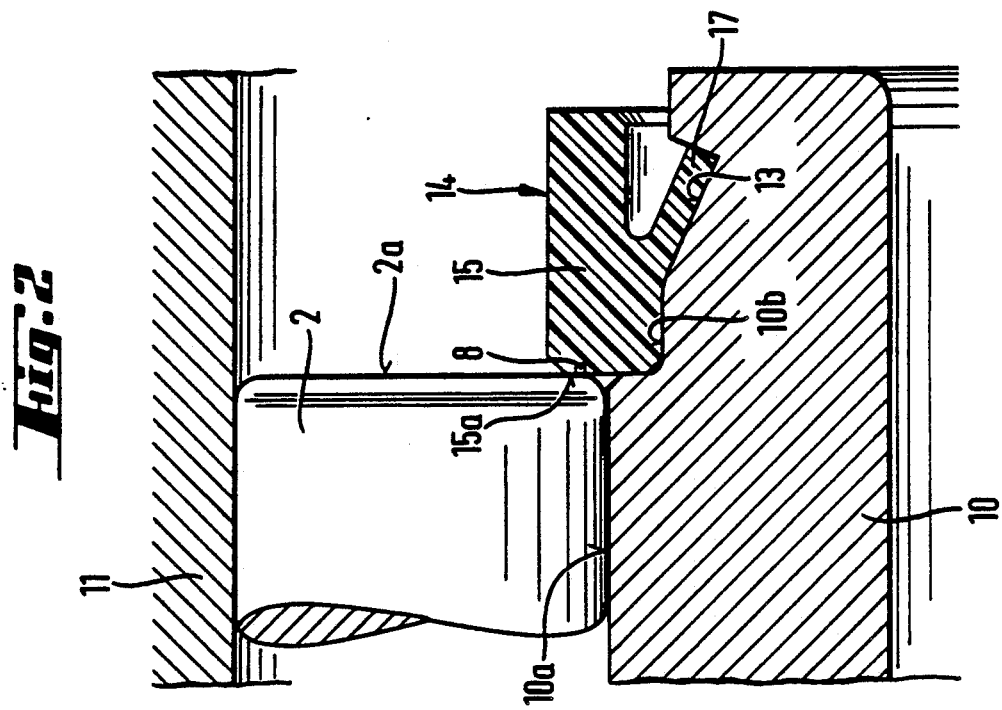
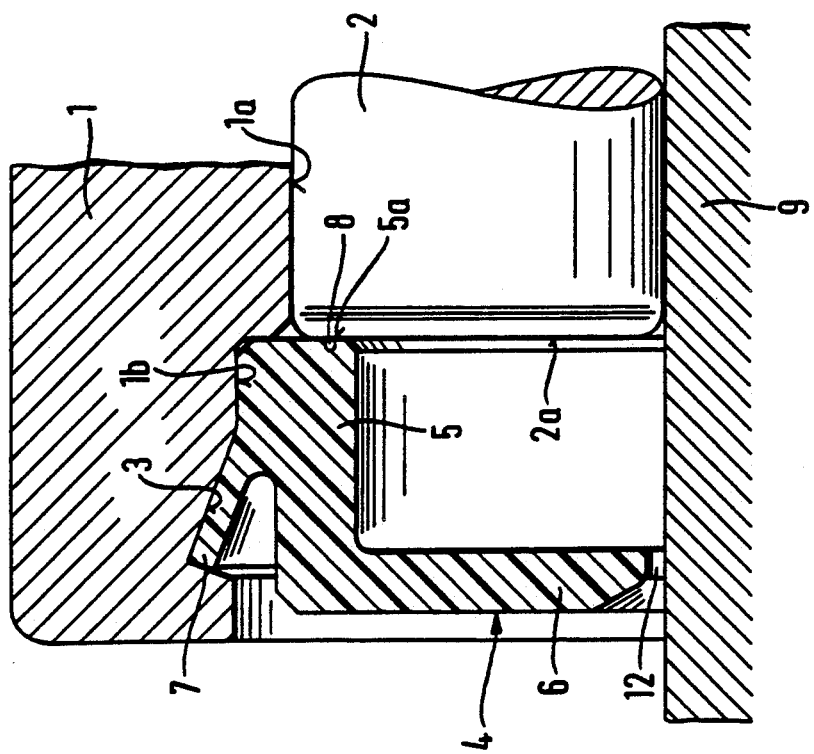

CYLINDRICAL-ROLLER BEARING

BACKGROUND OF THE INVENTION

This invention relates to a cylindrical-roller bearing comprising, at the external and/or the internal race thereof, guiding and retaining rim means for the cylindrical rollers.

Up to now, the retaining means serving for the lateral guidance and axial support of the rollers are usually integral with the internal and the external races of the bearing. This results evidently in a metallic contact between the rollers and the retaining means which must be considered as unsatisfactory in view of the friction components thereof. It is, indeed, known to provide roller bearings having cylindrical rollers with loose retaining flange rings of sintered steel, described in Austrian Pat. No. 352,484, which offers advantages in the manufacture and improves the functioning of the bearing in emergency situations; the end faces of the flange rings turned toward the rollers can be provided with lubricating grooves. However, the tribological properties of the bearing are hardly improved, and special steps are required for clamping together the flange rings and the races to obtain an integrated bearing.

Finally, it is also known in many cases to provide an annular groove or the like in one of the races, adjacent the rolling surface thereof, and to snap an elastic ring into such groove, such rings serving, however, as optionally reinforced sealing rings which are to prevent the escape of grease from the bearing and the penetration of impurities into the same, but have nothing to do with guiding or supporting the rollers in the races.

OBJECTS AND SUMMARY OF THE INVENTION

It is an object of the invention to provide a cylindrical-roller bearing of reduced friction components permitting a favorable mode of assembly and simplified manufacture.

This object is attained, in accordance with the invention, by a roller bearing of the initially described type in which the guiding and retaining rim means comprise at least one roller-retaining ring of synthetic plastics material which ring is snap-connected with one of the races of the bearing.

Thus, in accordance with the invention, the conventional guiding and retaining rims, integral with at least one of the races, are replaced by separate rings of synthetic plastics material, so that, between these and the end faces of the rollers, there is no metallic contact, and friction between them is correspondingly reduced. As the plastics rings constituting the guiding rims are adapted to be snapped elastically into the external or internal race of the bearing, such bearing can be assembled as a modular design, i.e. the individual parts can be assembled in a particularly easy manner.

A conventional annular guiding and retaining rib or rim being integral with the respective bearing race must have a ground-in rolling surface for contact with the rollers at minimum friction, but seriously complicates the grinding-in of the main rolling surface of the respective race. The invention avoids the special manufacturing steps required in manufacturing the conventional bearings, for, the groove required for having the plastics ring snapped-in can be produced on an automatic machine by means of a suitable tool, thereby greatly simplifying the manufacture of the bearing.

It is possible to provide a synthetic plastics ring constituting the guiding and retaining rim on both sides of the bearing races, but it is also possible to provide, in combination, a conventional integral rim on one side, and a separate plastics ring according to the invention on the opposite side of the external or internal race, for instance, when the bearing is to be subject to an axial load acting especially in one axial direction. Particularly suitable, however, is the retaining ring of synthetic plastics material according to the invention in bearings which are subjected to higher radial and lower axial stresses.

In a further embodiment of a bearing containing the retaining means according to the invention, the plastics material ring constituting the guiding rim means bears an annular sealing flange or lip protruding away from the race associated with the retaining means toward the other, opposite race, whereby the plastics ring exercises a double function of serving as a guiding and retaining rim for the rollers, on the one hand, and as a sealing ring, on the other hand; the annular sealing lip need not be in sliding contact with the opposite race of the bearing, but can act by a sealing gap or clearance. This is advantageous because the replaced grease will form a collar in the available free space behind the annular gap, which collar acts as a protection against the penetration of particles of dirt and dust into the bearing from the outside.

In order to obtain an embodiment which is particularly simple to assemble and is nevertheless sufficiently strong and firmly in place, the plastics ring serving as the guiding and retaining rim means can be provided at its side facing toward the race with which it is associated, with an annular elastically flexible anchoring lip or flange which is integral with the ring and extends, in a direction away from the rollers, in a conical plane transverse to the central bearing axis, and spreading away from the axially elongated body of the retaining ring.

It is adapted to fit into an annular groove, having a saw tooth profile, in the respective race of the bearing, on face of the race turned toward the other race, whereby, when snapping the retaining synthetic plastics ring into the race with which it is to be associated, the anchoring lip will penetrate into the saw-tooth profiled groove of the race and will be initially elastically compressed therein and will then assume its original conically spreaded shape serving as a barb preventing axial displacement of the retaining ring away from the rollers. It is self-evidently also possible to provide, in the race in question, beside each other two or more annular grooves having saw tooth section in an axial plane, and to provide on the synthetic plastics ring annular ribs or beads of an axial sectional configuration corresponding to that of the grooves, taking the place of the above-described anchoring lip.

In order to further improve the friction components, the retaining rim means constituted by the synthetic plastics ring can be further provided, in a manner known per se, with lubricating grooves in the end face thereof turned toward the rollers.

BRIEF DESCRIPTION OF THE DRAWING

Further objects and advantages of the roller bearing of the invention will become apparent from the following description thereof having reference to the accompanying drawing in which FIG. 1 shows in axial sectional view part of a roller bearing according to the invention in a first preferred embodiment of the synthetic plastics retaining ring therein, associated with the external race of the bearing, and FIG. 2 is a similar view, but showing another embodiment of the retaining ring associated with the internal race of the bearing.

DETAILED DESCRIPTION OF THE EMBODIMENTS SHOWN IN THE DRAWING

In the bearing illustrated in FIG. 1, the external race 1 bears, besides the rolling surface 1a for the rollers 2, in an axially outwardly situated internal face 1b, an annular groove 3 of saw tooth profile, in which there is snapped in position a synthetic plastics roller-retaining ring 4. This ring 4 comprises a main ring body 5, elongated in axial direction, constituting the guiding and retaining rim body whose axially inwardly directed end face 5a is contacted by the rollers 2 and prevents their axial displacement from the running surface 1a. The ring body 5 bears at its opposite end a radially inwardly extending annular sealing flange or lip 6 leaving free an annular gap 12 between the inner rim of the flange 6 and the surface of the internal race 9 of the bearing.

On the side of the ring body 5 facing toward the external race 1, the synthetic plastics ring 4 bears an anchoring lip or flange 7 spreading conically away from the body 5 in a direction away from the rollers 2 and being elastically resilient, which lip 7 is of a configuration fitting into the annular race groove 3 and constituting the snap-in element proper. This element acts as a barb in the snapped-in position as shown in FIG. 1.

The embodiment shown in FIG. 2 differs from that shown in FIG. 1 in that the synthetic plastics ring 14 has an anchoring lip 17 being integral with the main ring body 15, and being snapped into an annular groove 13 having saw-tooth profile which is provided in the face 10b of an internal race 10 which face is located next adjacent the running surface 10a and faces outwardly toward an outer race 11 of the bearing. This retaining ring 14 bears no sealing flange. No further features are provided at the external race 11 for retaining the rollers 2 which are prevented from axial displacement by abutting with their external end faces 2a against the axially inwardly directed end face 15a of the ring body 15. In this latter end face 15a lubricating grooves 8 can be provided in a similar manner as in the embodiment shown in FIG. 1.

I claim:

1. A cylindrical roller bearing assembly, comprising an external annular race,
   an internal annular race, said races being disposed in parallel about a central bearing axis,
   a plurality of rollers disposed between said races, and
   guiding and retaining rim means associated with at least one of said races,
   said guiding and retaining rim means comprising at least one retaining ring made from a synthetic plastic material,
   said retaining ring including an annular end face abutting against one end of said rollers and extending in a plane transverse to said central bearing axis, said retaining ring being in contact with said rollers along said one end of said rollers only,
   said retaining ring further including a resilient annular lip made from said synthetic plastic material extending in a plane conically intersecting said central bearing axis towards said associated race and away from said annular end face,
   said associated race having an annular groove of saw-tooth shape adapted to tightly receive said annular lip,
   said annular lip being snap-connected into said annular groove,
   said retaining ring providing axial support to said rollers and acting to prevent axial displacement of said rollers.

2. The roller bearing assembly of claim 1, wherein said retaining ring includes an annular flange projecting away from said associated race towards said other race, said flange being transverse to said central bearing axis.

3. The roller bearing assembly of claim 1, wherein said annular end face of said retaining ring has at least one lubricating groove.

* * * * *